2,802,712

METHOD OF FINISHING WOOD

Ira Weber, Long Island City, N. Y., assignor to Interchemical Corporation, New York, N. Y., a corporation of Ohio No Drawing. Application January 29, 1953,
Serial No. 334,095

7 Claims. (Cl. 8—6.5)

This invention relates to a method of finishing wood and, more particularly, to a new and rapid procedure of staining and filling or coating wooden surfaces to preserve them and to accentuate the grain and natural beauty of such surfaces.

The procedures of finishing wood comprise, in general, after a sanding and bleaching operation (provided the latter is called for), the steps of staining, filling (with the exception of several woods such as cedar, cypress, Douglas fir, hemlock and others which do not require filling) and coating the wooden surface with a varnish or lacquer, which is usually followed by rubbing and polishing.

Of the various staining media, the older stains, such as (1) the water-soluble stains, (2) the oil stains and (3) the spirit soluble stains have been largely abandoned, because they either have a tendency to raise the grain and to roughen the surface (1), which requires a subsequent wash-coating and careful sanding, or they bleed into the filler or top coat (2,3), which necessitates a varnish or shellac sealer, or they are fugitive and of inferior lightfastness (2,3), notwithstanding the protection of a top coat.

Modern stains showing none of the afore-described shortcomings comprise water-soluble aniline dyes, dissolved in an ether alcohol or glycol ether and having one or several low boiling organic solvents such as methanol and toluol added thereto. This type of stains is characterized by non-grain raising properties and by a lightfastness which is about equal to that of the water-soluble stains and better than that of the spirit- and oil-soluble stains. Moreover, these stains do not bleed into lacquer and varnish top coats. However, in common with the older stains they have the disadvantage that they require a certain drying time, usually overnight, before one can proceed with the next step, i. e. filling or varnishing and lacquering, respectively.

I have now found a method which does not use stains made from water-soluble aniline dyes or any of the other afore-mentioned stains, but consists in using a stain made by dissolving a pigment, such as the phosphotungstic, phosphomolybdic or tannic acid salt of a basic dyestuff and other pigments in an acid amide taken from the group consisting of formamide and amine substituted aliphatic acid amides which are liquid at ordinary temperatures and are defined by the general formula

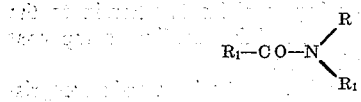

wherein R represents hydrogen or a lower alkyl and $R_1$ represents hydrogen, a lower alkyl, or a hydroxy, or alkoxy substituted lower alkyl. Included under this general formula are: methyl formamide, dimethyl formamide, ethanol formamide, isobutyl formamide, dimethyl acetamide, dimethyl butyramide, dimethyl methoxyacetamide and others. All these compounds are suitable as solvents for such pigments, although, in view of its price and its higher solubilizing power, I prefer the use of dimethyl formamide. Formamide, as such, is the least useful as prime solvent because the solubility of these pigments therein is, generally, lower than in the other amides of the series, but it can be used advantageously as a diluent of stock solutions made up with one of the other of the above-mentioned acid amides.

The pigments which can be used are pigments of the type represented by: salts of basic dyes with phosphotungstic, phosphomolybdic and tannic acid as well as metal salts of acid dyes which are normally insoluble, although the former give colors of greater brilliancy and cleanliness. After the wood has been stained by means of an amide solution of one or several of these pigments, the freshly stained, evenly penetrated wooden surface does not only permit, but advantageously calls for immediately carrying out the next step, namely to apply a wash coat, filler or top coat. The solvent contained in the subsequent coating is selected to act as an incompatible diluent and to precipitate the stain as a pigment within the fibers of the wood. These new pigment stains exhibit numerous advantages over the prior art stains. In the first place, they do not accumulate on the surface and, secondly, they are transparent and therefore, in contrast to the old type pigment stains which are opaque, do not hide the grain but enhance the appearance of the wood. In addition, they are extremely lightfast, non-bleeding and show greater color strength than prior stains, including the non-grain raising stains. The precipitation by the solvent contained in the filler or top coat, particularly if applied immediately after staining, produces pigments of extremely fine particle size which remain distributed with complete uniformity throughout the wood surface. As against pigment stains which it is often difficult to retain evenly distributed in the liquid vehicle and which, after application upon the wood, do not penetrate into the wood surface, the present method combines the advantages of staining with a dye solution which penetrates deeply into the pores of the wood with the valuable properties, such as lightfastness, of a pigment stain deeply embedded in the wood surface, which results from the subsequent application of a wash coat, filler or top coat. Another advantage is the possibility of applying the filler, varnish, or lacquer immediately after staining and the gain in time as a result thereof.

The phosphotungstic, phosphomolybdic or tannic acid salts of the following basic dyestuffs, identified by their Color Index number, have been found particularly useful for the staining of wood: Victoria Blue (C. I. 729), Auramine (C. I. 665), Rhodamine B (C. I. 749), Rhodamine 6G (C. I. 752), Malachite Green (C. I. 657), Brilliant Green (C. I. 662), Methyl Violet (C. I. 680), Thioflavine TC (C. I. 815), as well as commercial mixtures of Thioflavine and Brilliant Green and of Auramine and Malachite Green.

In conformance with the prior practice of wood staining, stock solutions are made up in desirable concentration, say from 3 to 10 percent, of the various pigments in, for example, dimethyl foramide or ethanol formamide as the solvent. As a rule, the pigments dissolve readily upon stirring in the cold. If desired, the dissolving may be aided by heating. Difficulties may be encountered with a phosphotungstic acid or other similar salt of Malachite Green which is discolored by free bases, such as dimethyl amine that sometimes appears as impurity in, say, dimethyl formamide in amounts of the order of 0.01 percent. This discoloration of Malachite Green can be prevented by adding an amount of a soluble organic acid (acetic acid, oxalic acid, etc.) to the amide solution which is sufficient to neutralize the free amine. Likewise, the color of Malachite Green discolored through free amine in the amide solution can be brought back by adding the required amount of acid afterwards.

The following examples are presented to illustrate the practice of the invention.

*Example 1*

For a dark mahogany wood stain, 5% stock solutions of the following dyestuff phosphotungstic acid salts in dimethyl formamide are mixed together to produce the composition below in which the parts given signify parts by weight:

200 parts Auramine phosphotungstic pigment stock solution
440 parts Rhodamine 6G phosphotungstic pigment stock solution
60 parts Malachite Green phosphotungstic pigment stock solution
60 parts Victoria Blue phosphotungstic pigment stock solution The solution is either used as is, or dimethyl formamide or formamide is added as thinner to match any desired strength.

*Example 2*

To produce a light mahogany wood stain, the following composition is made according to Example 1:

400 parts Rhodamine B phosphotungstic pigment stock solution
60 parts Malachite Green phosphotungstic pigment stock solution
560 parts Auramine phosphotungstic pigment stock solution
261 parts dimethyl formamide or formamide Phosphomolybdic or tannic pigments can be employed in lieu of the phosphotungstic pigments of the dyestuffs enumerated in the foregoing examples and the dimethyl formamide can be replaced by ethanol formamide or any other of the amides covered by the general formula, except by formamide which, because of its low power of solubility, is preferably used as thinner only.

After staining the wood with one of the foregoing or a similar composition, a wood filler or top coat is applied which is characterized by comprising an incompatible solvent in sufficient amounts to precipitate the pigment or pigments within the surface area of the wood. Preferable diluents for this purpose are aliphatic hydrocarbons, alcohols, or lacquer thinners.

Notwithstanding that the herein disclosed pigment stains do not bleed and do not raise the grain of the wood, the use of a so-called wash coat may be desirable prior to the application of a filler, in order to avoid absorption by the wood of some of the filler vehicle and the resulting discoloration of open-grained wood, such as mahogany or walnut. Moreover, the application of a wash coat facilitates the subsequent removal of excess filler from the surface of the wood.

*Examples of wash coats.*—suitable for producing the herein disclosed formation of pigment within the grain of the wood:

(a) 1 part of a 4 pound cut of shellac (37.11% shellac in ethanol), diluted with 7 parts of ethanol.

(b) a 7% solution of nitrocellulose in a solvent mixture consisting of 30% butyl acetate, 10% butanol and 60% toluol.

*Example of a filler composition.*—suitable to be used without a prior wash coat for producing the herein disclosed pigment formation within the grain of the wood:

| | Parts |
|---|---|
| Barytes | 40.0 |
| Mineral black | 4.5 |
| Burnt umber | 2.0 |
| Calcium carbonate | 26.0 |
| Silica | 11.0 |
| Linseed oil (alkali refined) | 12.5 |
| Japan type drier (Fed. specification TT-D-651a, Type 1) | 0.5 |
| Varnolene (a petroleum fraction of predominantly aliphatic hydrocarbons, having a boiling range from 155.6° to 196.7° C., a flash point of 38.9° C. and a weight per gal. of 6.58 lbs.) | 103.5 |

After the steps of staining the wood and precipitating the pigment by means of a wash coat or filler, the wood surface is finished by standard procedures. If it is desired to apply a top coat without prior wash coating or filling, as is the practice with inexpensive furniture, it is obvious that any top coat containing the usual lacquer thinners will cause the desired precipitation of the pigment stain.

In the claims, I have used the term "film former carried by the diluent" to mean the film formers of fillers, wash coats, and top coat lacquers and varnishes mentioned in the specification.

I claim:

1. The method of finishing wood which includes the steps of making stock solutions of pigments selected from the group consisting of the normally insoluble salts of basic dyes with phosphotungstic, phosphomolybdic and tannic acid dissolved in an acid amide of the group of aliphatic acid amides which are liquid at ordinary temperatures and are defined by the general formula

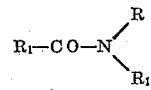

wherein R represents hydrogen and an unsubstituted lower alkyl and $R_1$ represents hydrogen, an unsubstituted, hydroxy substituted and alkoxy substituted lower alkyl, mixing such stock solutions and diluting with one of the said acid amides to obtain a wood staining medium of the desired color strength, treating the surface of wood with the said staining medium and applying a composition to the surface of the wood before the amide has evaporated from the wood surface, characterized by (1) a diluent which is incompatible with the said acid amide solution and precipitates the stain in form of minute pigment particles within the pores of the wood, and (2) a film former carried by the diluent.

2. The method according to claim 1, wherein the acid amide used as solvent in making up the stock solutions is dimethyl formamide.

3. The method according to claim 2, wherein the stock solutions are diluted with formamide to the desired color strength.

4. The method according to claim 1, wherein to the wood treated with the said staining medium a wash coat is applied comprising ethanol as diluent.

5. The method according to claim 1, wherein to the wood treated with the said staining medium a filler composition is applied comprising an aliphatic hydrocarbon as the vehicle.

6. The method according to claim 1, wherein to the wood treated with the said staining medium a top coat is applied comprising a lacquer.

7. The method of finishing wood with a stain comprising a pigment colorant selected from the group consisting of the normally insoluble salts of basic dyes with phosphotungstic, phosphomolybdic and tannic acid dissolved in an acid amide of the group of aliphatic acid amides which are liquid at ordinary temperatures and are defined by the general formula

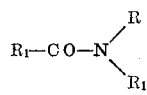

wherein R represents hydrogen and an unsubstituted lower alkyl and $R_1$ represents hydrogen, an unsubstituted, hydroxy substituted and alkoxy substituted lower alkyl, comprising treating the surface of wood with the said staining medium and applying a composition to the surface of the wood before the amide has evaporated from the wood surface, characterized by (1) a diluent which is incompatible with the said acid amide solution and precipitates the stain in form of minute pigment particles within the pores of the wood, and (2) a film former carried by the diluent.

References Cited in the file of this patent
UNITED STATES PATENTS

| | | |
|---|---|---|
| 2,225,603 | Lubs | Dec. 17, 1940 |
| 2,225,604 | Lubs | Dec. 17, 1940 |